US012499743B2

(12) United States Patent
Tachi

(10) Patent No.: US 12,499,743 B2
(45) Date of Patent: Dec. 16, 2025

(54) SIGNAL PROCESSING FOR HAPTIC SEATING SYSTEMS

(71) Applicant: ALPS ALPINE CO., LTD., Tokyo (JP)

(72) Inventor: Ryosuke Tachi, Rochester Hills, MI (US)

(73) Assignee: Alps Alpine Co., Ltd., Tokyo (JP)

( * ) Notice: Subject to any disclaimer, the term of this patent is extended or adjusted under 35 U.S.C. 154(b) by 152 days.

(21) Appl. No.: 18/535,243

(22) Filed: Dec. 11, 2023

(65) Prior Publication Data

US 2025/0191450 A1 Jun. 12, 2025

(51) Int. Cl.
*H04B 3/36* (2006.01)
*A47C 1/00* (2006.01)
*G08B 6/00* (2006.01)

(52) U.S. Cl.
CPC . *G08B 6/00* (2013.01); *A47C 1/00* (2013.01)

(58) Field of Classification Search
CPC .................................... G08B 6/00; A47C 1/00
See application file for complete search history.

(56) References Cited

U.S. PATENT DOCUMENTS 5,314,403 A 5/1994 Shaw
9,700,146 B1 7/2017 Emerson
10,440,455 B2 10/2019 Fox
10,661,682 B2 * 5/2020 Alequin ............... B60N 2/0244
10,699,538 B2 * 6/2020 Novich .................... G10H 3/26
11,490,197 B1 11/2022 Wu
2009/0154737 A1 6/2009 Ostler et al.
2018/0233163 A1 * 8/2018 Eagleman ............... G10L 21/16
2022/0358818 A1 11/2022 Lamy
2025/0008264 A1 * 1/2025 Smith ..................... G06F 3/016

FOREIGN PATENT DOCUMENTS

JP 4303026 7/2007

OTHER PUBLICATIONS

Project Brooklyn, Concept—CES 2021, Razer, https://www.razer.com/concepts/razer-project-brooklyn, dated 2021.

* cited by examiner

*Primary Examiner* — Toan N Pham
(74) *Attorney, Agent, or Firm* — Knobbe, Martens, Olson & Bear, LLP

(57) ABSTRACT

A haptic seating system comprising can include a seat, a haptic device, and a haptic signal controller. The system can receive an acoustic signal and generate a haptic source signal. The system can convert the haptic source signal into first and second constituent haptic signals and modify, using a frequency expander, the first and second constituent haptic signals into first and second expanded constituent haptic signals with modified intensities within a target frequency range. The system can compress each of the first and second expanded constituent haptic signals to generate compressed constituent haptic signals having compressed intensities. The system can summate, within the target frequency range, the intensities of the modified haptic source signal, the compressed intensities of the first compressed constituent haptic signal, and the compressed intensities of the second compressed constituent haptic signals. The system can generate a haptic response within the seat based on the summated intensities.

20 Claims, 11 Drawing Sheets

(Continuation)

(Continution)

SIGNAL PROCESSING FOR HAPTIC SEATING SYSTEMS

BACKGROUND

Field

This disclosure relates generally to acoustic systems and particularly to signal processing systems and methods for haptic seating systems.

Description of Related Art

Vibration device systems can be used in chairs or other systems that can be used in entertainment. These vibration device systems may have limitations that reduce their effectiveness under certain circumstances, such as when certain frequencies are desired. Some features with respect to vibration device systems are lacking in the art, and this application provides various solutions for this lack of features.

SUMMARY

Example embodiments described herein have innovative features, no single one of which is indispensable or solely responsible for their desirable attributes. Without limiting the scope of the claims, some of the advantageous features will now be summarized.

In some embodiments, a haptic seating system comprising can include a seat, a haptic device, and a haptic signal controller. The system can receive an acoustic signal and generate a haptic source signal. The system can convert the haptic source signal into first and second constituent haptic signals and modify, using a frequency expander, the first and second constituent haptic signals into first and second expanded constituent haptic signals with modified intensities within a target frequency range. The system can compress each of the first and second expanded constituent haptic signals to generate compressed constituent haptic signals having compressed intensities. The system can summate, within the target frequency range, the intensities of the modified haptic source signal, the compressed intensities of the first compressed constituent haptic signal, and the compressed intensities of the second compressed constituent haptic signals. The system can generate a haptic response within the seat based on the summated intensities.

BRIEF DESCRIPTION OF THE DRAWINGS

The following drawings and the associated descriptions are provided to illustrate embodiments of the present disclosure and do not limit the scope of the claims.

Figure 1:
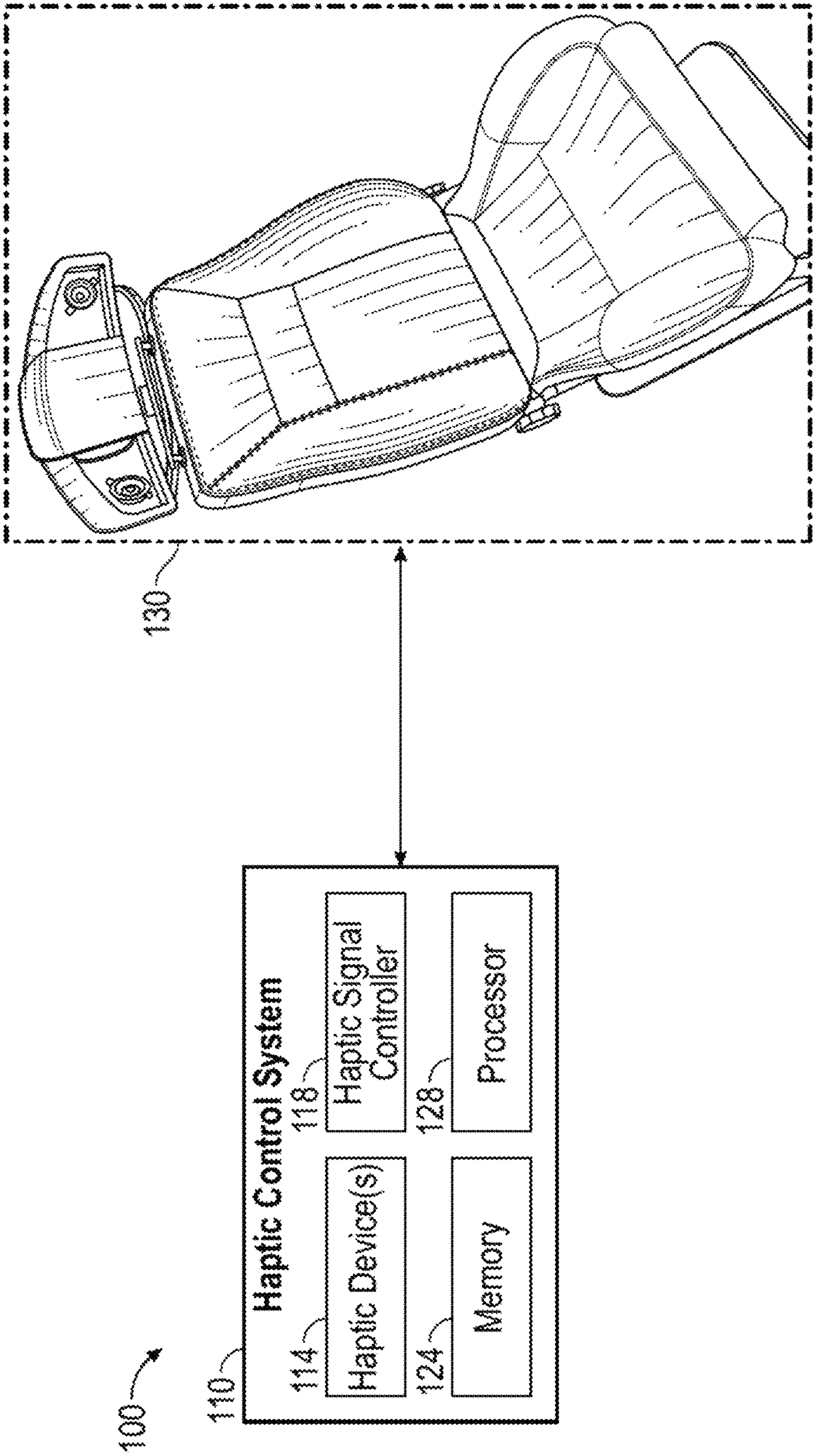
FIG. 1 shows a schematic of an example haptic seating system that includes a seat and a haptic control system.

These and other features will now be described with reference to the drawings summarized above. The drawings and the associated descriptions are provided to illustrate embodiments and not to limit the scope of any claim. Throughout the drawings, reference numbers may be reused to indicate correspondence between referenced elements.

DETAILED DESCRIPTION

Vibration device systems can be implemented in entertainment systems to improve the immersive experience for the user. The vibration device systems may be embedded in or otherwise incorporated into the entertainment system. The entertainment system can include a seating system. For example, the vibration device systems can include a haptic device that is disposed within a seat of the seating system. The demand for gaming chairs is expanding as more people telework and play games in response to pandemics and other natural causes. There are many kinds of gaming chairs. Other types of seating systems can benefit from the haptic systems described herein. For example, automobile seating and/or seating for movie theaters or home use may also benefit.

Haptic systems and other vibration device systems described herein can translate a received signal into an output haptic (e.g., vibration) signal. The received signal may be an audio signal so that the vibration device signal corresponds to an audio experience of the user. In some cases, the frequency of the audio signal may correspond to the frequency of the output haptic signal. Vibration devices may be referred to as vibrators or vibration transducers and may include, for example, haptic devices, shakers, exciters, tactile transducers, and/or other vibration devices.

Modern vibration device systems may have hardware and/or software limitations. For example, the hardware of modern vibration device systems may have a range of frequencies over which the vibration device operates, but may only have a portion of that range where vibrations above a threshold minimum force can be produced (see, e.g., FIG. 3). Vibration devices may be able to receive signals over the full range but may only be able to produce discernible output within a portion of that range. The vibration device may not be able to output discernible vibration output in the whole of a target frequency range and/or not a sufficient vibration output in the whole of the target frequency range. A target frequency range for the output vibration signal may be lower or higher than a corresponding input signal (e.g., audio signal).

Vibration device systems may also have software limitations. For example, the output of some vibration device systems may output a software-limited signal or include results that were from upstream software-limited effects. For example, some vibration device controllers may not be able to properly recognize and/or translate a received digital sound signal. Additionally or alternatively, the signals that are received may have been limited in frequency and/or amplitude, thus translating to a suboptimal output haptic signal.

Vibration device systems, such as haptic systems, are designed to provide users with tactile feedback, allowing them to feel sensations such as vibrations, textures, and forces. In the context of entertainment systems, haptic systems can be seamlessly integrated, even within seating systems like gaming chairs. Haptic devices can be engineered to generate various haptic effects that synchronize with the audio or visual content being experienced. These effects could include vibrations that correspond to specific audio cues, adding an extra layer of realism to the overall experience. The received audio signal can be translated into an output haptic signal, bridging the auditory and tactile senses.

Embodiments described herein provide solutions to many of the hardware and software limitations vibration device systems, including vibration device seating systems. The systems described herein can translate vibration signals, such as haptic signals, to a target frequency range that is compatible with the hardware of a haptic device. Additionally or alternatively, the systems may be able to generate supporting frequency ranges that may have been clipped or otherwise software-limited. For example, embodiments described herein may be able to expand frequencies using software algorithms, such as using a digital harmonic enhancement (DHE) algorithm and/or a fractal interpolation function (FIF). This may lead to a more detailed and/or expansive output signal, which can result in a richer user experience via the haptic system.

In some embodiments, the systems described herein can involve a haptic seating system that includes various components designed to create an enhanced user experience. The system may include a seat designed to provide support for a human user. Within this seat, a haptic device can be positioned and be configured to generate haptic signals. These signals can be configured to provide a force above a minimum force threshold and operate within a designated frequency range. The system can include a haptic signal controller that is configured to interface with the haptic device. The controller's operation can be directed by instructions stored in a non-transitory memory. These instructions, when executed by the haptic signal controller, lead to a sequence of actions that define the functionality of the haptic seating system.

Upon receiving an acoustic signal, the haptic seating system can generate a haptic source signal. To refine this signal for, a low-pass filter may be employed. This filter can modify the haptic source signal, preserving intensities within an initial frequency range that falls below the target frequency range of interest. The outcome may be a modified haptic source signal having target frequency range intensities and initial frequency range intensities.

The haptic source signal can then undergo further processing. This processing can involve the application of at least one band-pass filter (e.g., a software filter), which can deconstruct the haptic source signal into a collection of constituent haptic signals. Two or more of these constituent haptic signals can be generated, at least one representing intensities within a lower-frequency sub-range of the initial frequency range, and another encapsulating intensities within a higher-frequency sub-range of that range.

The system may additionally or alternatively use a frequency expander. A frequency expander may include a tool (e.g., software tool) that is configured to transform the first and second constituent haptic signals. This transformation can result in adjusted intensities that are now within the target frequency range. These signals may be compressed, resulting in compressed constituent haptic signals.

Within the target frequency range, the intensities of the modified haptic source signal may be combined with the compressed intensities of the constituent haptic signals. This summation can result in a target haptic signal. The target haptic signal can then be used to generating a haptic response within the seat. Thus, the system may allow for a modifying a source signal to achieve a haptic response that is within a frequency range available for a particular haptic device. These and other features are discussed in more detail herein.

Reference will now be made to the Figures. Unless otherwise specified, terms used herein will have their ordinary and customary meaning.

FIG. 1 shows a schematic of an example haptic seating system 100 that includes a seat 130 and a haptic control system 110. The haptic control system 110 can include one or more haptic devices 114, a haptic signal controller 118, memory 124, and/or a processor 128. The haptic control system 110 can receive a signal from a source (not shown). For example, the signal sources may correspond to a radio receiver, a microphone, a media player (e.g., DVD player, gaming console, MP4 player, etc.), a computer controller, or any other media source. The source signal can be transmitted to the haptic control system 110 (e.g., to the haptic signal controller 118) via a connection, such as a wired connection. Wireless connections are also possible in some embodiments. The source signal may be acoustic signals. The source signal may be analog or digital signals. The signals may include one or more of a loudness attribute, a timbre attribute, a pitch attribute, and/or any other attribute. The processor 128 and/or the haptic signal controller 118 may be able to determine one or more of a loudness levels, frequencies, durations, etc. of the source signal.

Loudness or volume may be used interchangeably and may generally refer to the perceived loudness by a user. Loudness/volume can be measured in decibels (dB), decibels relative to full scale (dBFS), or some other measure. To avoid confusion, loudness and volume generally refer to an attribute of the output sound, whereas "loudness level" or "measure of loudness" generally refers to an attribute of the source signal (modified or unmodified), and "volume level" generally refers to an attribute (e.g., amount of gain) applied to the source signal, for example, by a user (e.g., via a volume knob) to modify the source signal.

Figure 2:
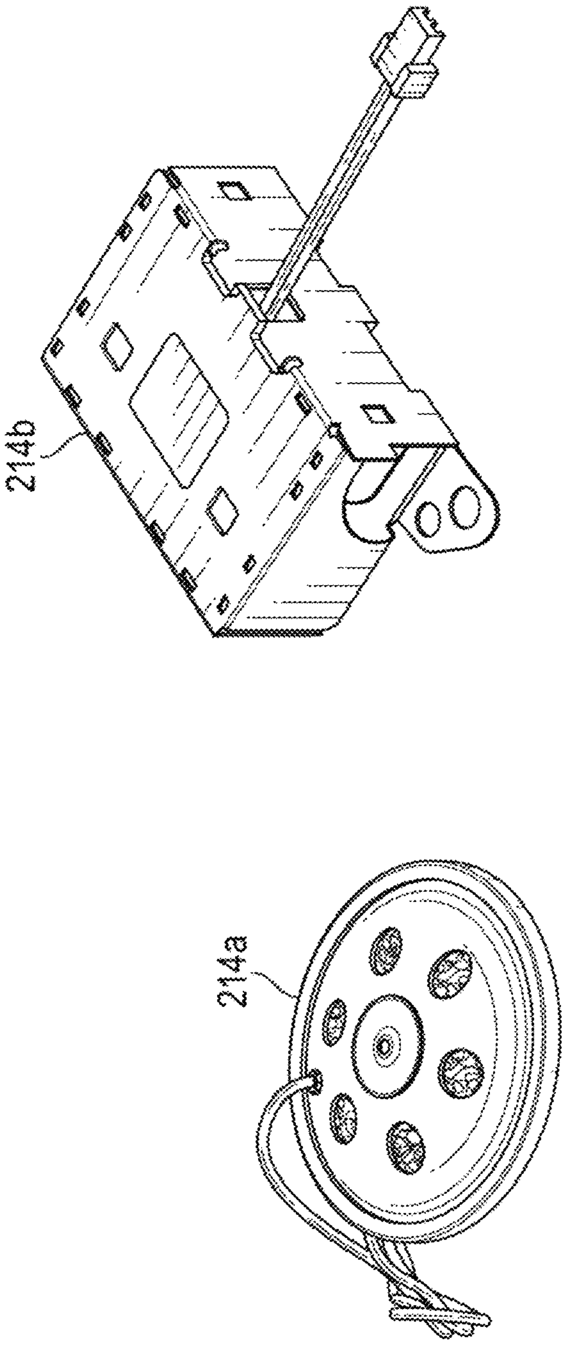
FIG. 2 shows two example vibration devices that may be used in the systems described herein.

FIG. 2 shows two example vibration devices 214*a-b* that may be used in the systems described herein. The vibration devices 214*a-b* may correspond to one or more of the haptic devices 114 described above.

The vibration devices 214*a-b* may provide vibrotactile feedback configured to provide tactile sensations, such as vibrations, to the user's skin or body. It enables users to perceive and interact with digital or virtual content through touch, enhancing their sensory experience. This vibration technology may be applied in various fields, including virtual reality, gaming, rehabilitation, and even accessibility devices for individuals with sensory impairments.

The vibration devices 214*a-b* can receive an input signal, such as from a digital source like audio, video, or sensor data. This input signal contains information that can be translated into tactile sensations. In the context of gaming, for instance, the input signal could correspond to in-game events like footsteps or explosions. In rehabilitation, it could represent therapeutic cues for exercises.

The received input signal may be analyzed and transformed into vibrational patterns by the vibration devices 214*a-b*. The vibration devices 214*a-b* can be configured to accurately represent the nuances of the input signal. Various algorithms can be employed to map the varying characteristics of the input signal onto the tactile output. For example, higher frequencies in the input signal might correspond to faster and more intense vibrations, while lower frequencies may translate to slower and gentler vibrations.

Once the signal is processed, vibrotactile actuators within the vibration devices 214*a-b* can generate the physical vibrations that the user feels. The actuators may include eccentric rotating masses (ERM) and/or linear resonant actuators (LRA). ERMs can create vibrations by unbalancing a rotating mass, while LRAs can use magnetic forces to create oscillatory motions. The vibrations can serve as a form of feedback corresponding to the original input signal.

The first vibration device 214*a* is a generally round vibration device that may be configured to provide vibrotactile feedback at a frequency range primarily at or below about 80 Hz. In some embodiments, the first vibration device 214*a* is configured to be disposed in a base of a seat (e.g., the portion of a seat configured to support the primary weight of a user).

The first vibration device 214*a* may include a "shaker" or "exciter" or "tactile transducer" and may be configured provide low bandwidth experience and/or isolation. Low frequencies may be easily diffracted and spread out when output as sound. Thus, low frequency sounds may be more easily masked by other sounds, compared to other kinds of vibration devices. By making the bass felt through vibration with the first vibration device 214*a*, it may be possible to achieve both isolation and the experience of bass without actually dropping the sound. However, in some cases the first vibration device 214*a* may be too heavy and/or large in size to be suitable for office or home chairs.

Accordingly, in some embodiments a smaller and/or lighter device, such as a haptic device, may be used to add vibration. Because the vibration frequency response of the second vibration device 214*b* may have one or two frequency peaks where sufficient vibrational force can be achieved, the amplitude at off-peak points may be too small to be detected or to provide sufficient haptic experience, without modification to the frequency. When using a broadband signal such as a music source, the amplitude of the second vibration device 214*b* may not be sufficient without signal modification, such as by using the systems and methods described herein.

Figure 3:
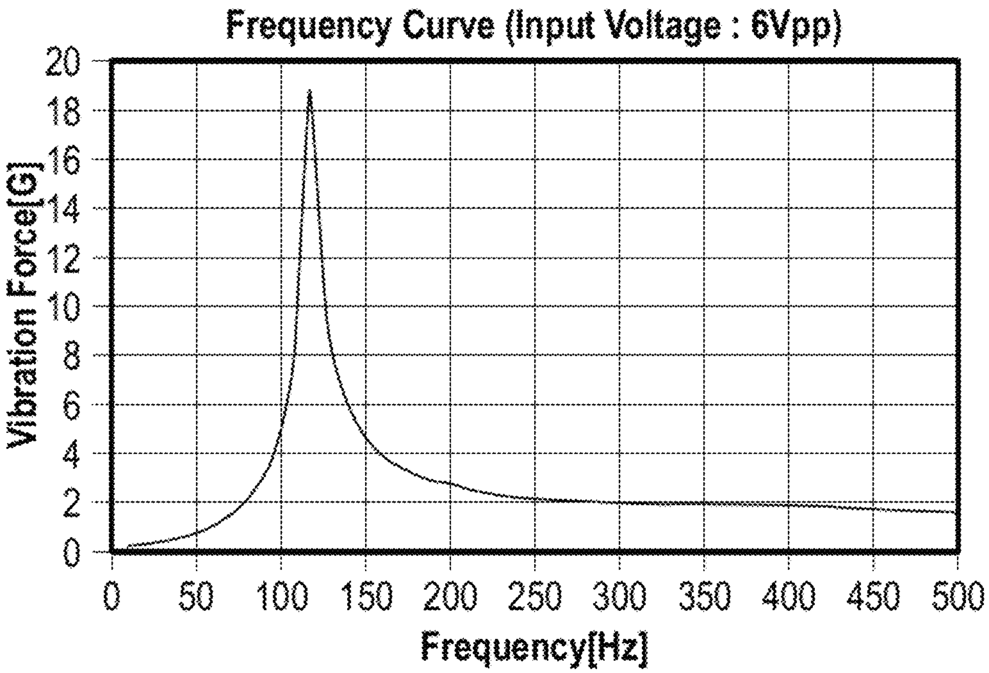
FIG. 3 shows an example frequency-force graph for a haptic device.

FIG. 3 shows an example frequency-force graph for a haptic device, such as the second vibration device 214*b*. For a target minimum vibration force of, say, at least 4 Gs, the device corresponding to the graph shown in FIG. 3 can produce the target minimum vibration force at frequencies between about 100-150 Hz, where "G" is an amount of force per unit mass experienced from the attractive force of gravity (about 9.81 $m/s^2$). The 100-150 Hz range may be a "target frequency range" for this device for target minimum vibration force of at least 4 Gs. Thus, frequencies outside of this frequency range may not correlate to a force of least the target minimum vibration force. Accordingly, it may be beneficial to modify frequencies outside of the target frequency range to fall within the target frequency range.

Figure 4:
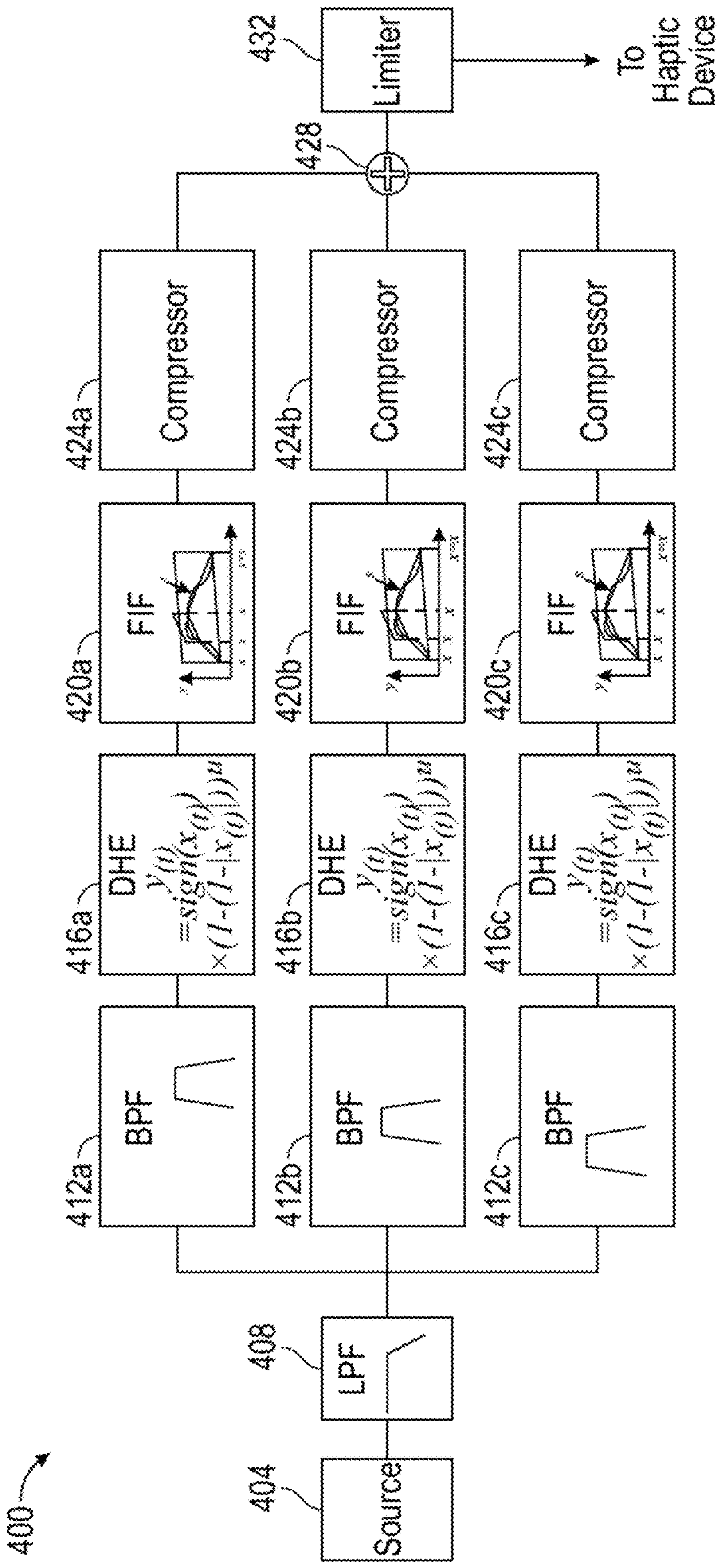
FIG. 4 shows an example signal processing framework for modifying source signals that do not fall within a target frequency range so that they fall within the target frequency range.

FIG. 4 shows an example signal processing framework 400 for modifying source signals that do not fall within a target frequency range so that they fall within the target frequency range. The signal processing framework 400 can begin with a signal source 404 that may generate a source signal. The signal source 404 may include a digital and/or analog signal. The source signal can be passed from the signal source 404 to a low-pass filter 408.

The low-pass filter 408 can reduce or even remove signals having a frequency higher than a threshold frequency. The low-pass filter 408 can be a software-based low-pass filter (LPF). In some embodiments, the low-pass filter 408 can eliminate (or nearly so) all frequencies above the target threshold frequency while passing those below unchanged. For example, its frequency response can be a rectangular function. The transition region present from the low-pass filter 408 can cause the source signal to have a rectangular function in the frequency domain and/or a convolution with its impulse response in the time domain.

The resulting signal from the low-pass filter 408 may need to be approximated. The low-pass filter 408 may modify the source signal using a Fourier transform. The low-pass filter 408 may be able to truncate and/or window the infinite impulse response to make a finite impulse response. The low-pass filter 408 can delay the signal for a period of time to offer greater accuracy in its truncating effect.

The signal processing framework 400 can include breaking a resulting filtered signal from the low-pass filter 408 into constituent signals by passing the filtered signal through respective frequency band-pass filters 412*a-c*. The higher frequency band-pass filter 412*a* can generate a higher frequency constituent frequency. The medium frequency band-pass filter 412*b* can generate a medium frequency constituent frequency. The lower frequency band-pass filter 412*c* can generate a lower frequency constituent frequency. Each of the frequency band-pass filters 412*a-c* can cut off filters below a corresponding lower threshold frequency and above a higher threshold frequency. The way the frequency band-pass filters 412*a-c* operate may parallel a number of those with regard to the low-pass filter 408 to accomplish the band-pass filtering. To avoid unnecessary repetition, those features will not be repeated here.

Each of the constituent filtered frequencies from the frequency band-pass filters 412*a-c* can then be passed through respective digital frequency expansions 416*a-c*. The digital frequency expansions 416*a-c* can provide additional frequencies (e.g., at different frequencies) than were present in the constituent filtered frequencies. The digital frequency expansions 416*a-c* can use one or more frequency expanders. The frequency expanders can be software expanders. The frequency expanders can include a digital harmonic expander (DHE).

The digital frequency expansions 416*a-c* can include a first digital frequency expansion 416*a* configured to operate on the higher constituent frequency, a second digital frequency expansion 416*b* configured to operate on the medium constituent frequency, a third digital frequency expansion 416*c* configured to operate on the lower constituent frequency. The digital frequency expansions 416*a-c* can include an analog system that takes a small amplitude signal as an input and produces a large amplitude signal as output. The large amplitude signal may be at the same or different frequency range as the input signal. The digital frequency expansions 416*a-c* can use nonlinear amplification. Additionally or alternatively, the digital frequency expansions 416*a-c* may involve linear, time-invariant expansion. In some embodiments, the digital frequency expansions 416*a-c* can output a signal having a phase change relative to the input signal. In some embodiments, the output signal can include a weighted sum of sinusoidal signals of the same and/or different frequencies. Additionally or alternatively, the amplitudes and/or phases may be modified by the digital frequency expansions 416*a-c*. In some embodiments, the digital frequency expansions 416*a-c* can produce outputs having sinusoids at frequencies in addition to those of the input. This may be achieved using a Taylor series expansion or some other formula for achieving nonlinear expansion and/or amplification.

The digital frequency expansions 416*a-c* can implement a function that expands the input signal of a digital sound source that may have deteriorated due to compression. The digital frequency expansions 416*a-c* can thus be used to compensate for the deterioration from compression. The expanded frequencies from the digital frequency expansions 416*a-c* can include overtones (e.g., frequency multiples). The digital frequency expansions 416*a-c* may be effective by obtaining a satisfying feeling of bass with low power consumption. The digital frequency expansions 416*a-c* can include implementing a signal modification function, such as: $y_{(t)}=\mathrm{sign}(x_{(t)})\times(1-(1-|x_{(t)}|))^{u}$. Other functions are possible.

In some embodiments, expanded signals (e.g., the overtones) can be passed through corresponding fractal frequency expansions 420*a-c*. The fractal frequency expansions 420*a-c* may be in addition to or alternative to the digital frequency expansions 416*a-c*. The fractal frequency expansions 420*a-c* can also expand the corresponding constituent filtered frequencies. The fractal frequency expansions 420*a-c* can generates higher frequencies by performing self-similar mapping calculations based on fractal theory.

Once the constituent frequencies have been filtered and expanded, each of the constituent frequencies can be compressed via corresponding compressions 424*a-c*. The compressions 424*a-c* can be effected by a compressor. The compressor can implement a software-based compression algorithm on the signals. The compressor may use dynamic range compression (DRC) or some other kind of compression to reduce an intensity (e.g., volume) of high amplitude sounds and/or increase an intensity of low amplitude sounds. This may have the effect of reducing or compressing an audio signal's dynamic range. The system may be able to allow a user to adjust compression parameters in order to change the way they affect sounds.

The compressions 424*a-c* can provide downward and/or upward compression to reduce the dynamic range of the constituent signal. Downward compression can reduce an amplitude of the signals that may be above a certain threshold. Additionally or alternatively, lower amplitude sounds below the threshold may remain unaffected. Upward compression can increase the amplitude of low-amplitude sounds below a certain threshold. Additionally or alternatively, the higher amplitude sounds above the threshold may remain unaffected.

In some embodiments, the compressions 424*a-c* can include expansions. Expansion may increase the dynamic range of the signal. Downward expansion may make the low amplitude sounds below the threshold even lower amplitude. Upward expansion may make the higher amplitude sounds above the threshold even higher amplitude.

At frequency summation 428, the constituent signals resulting from the corresponding compressions 424*a-c* can be summated together to form a combined signal. The combined signal can have primarily or only frequencies within the target frequency range that are above a certain amplitude threshold. Frequencies outside the target frequency range may be not be above the amplitude threshold.

At signal limitation 432 the combined signal may be limited by software and/or hardware. Compression and limiting may have similar effects. Accordingly, during the signal limitation 432 the signal may undergo similar modifications as with the compressions 424*a-c*. In some embodiments, the signal limitation 432 can be used for shaping a dynamic range of the combined signal by attenuating the high amplitude parts and boosting the low amplitude parts. Additionally or alternatively, the signal limitation 432 may be configured to catch peaks, prevent audio clipping, and/or preserve sonic integrity. The signal limitation 432 may be configured to keep the signal from overwhelming any part of an audio signal chain. The signal limitation 432 may avoid coloring the combined signal. The signal limitation 432 may be configured to compress the signal with a high ratio and/or a short attack time.

Figure 5A:
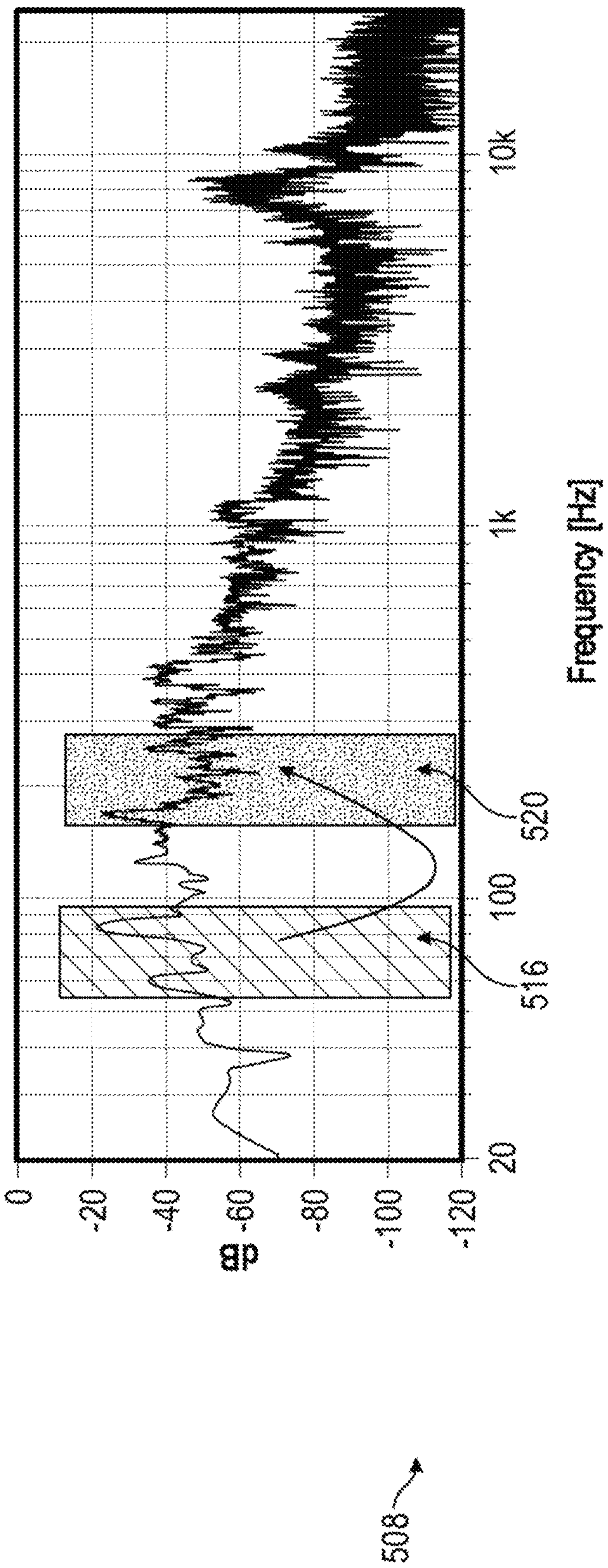
FIG. 5A shows an example continuous sound frequency-intensity graph and continuous sound signal processing framework.
Figure 5A:
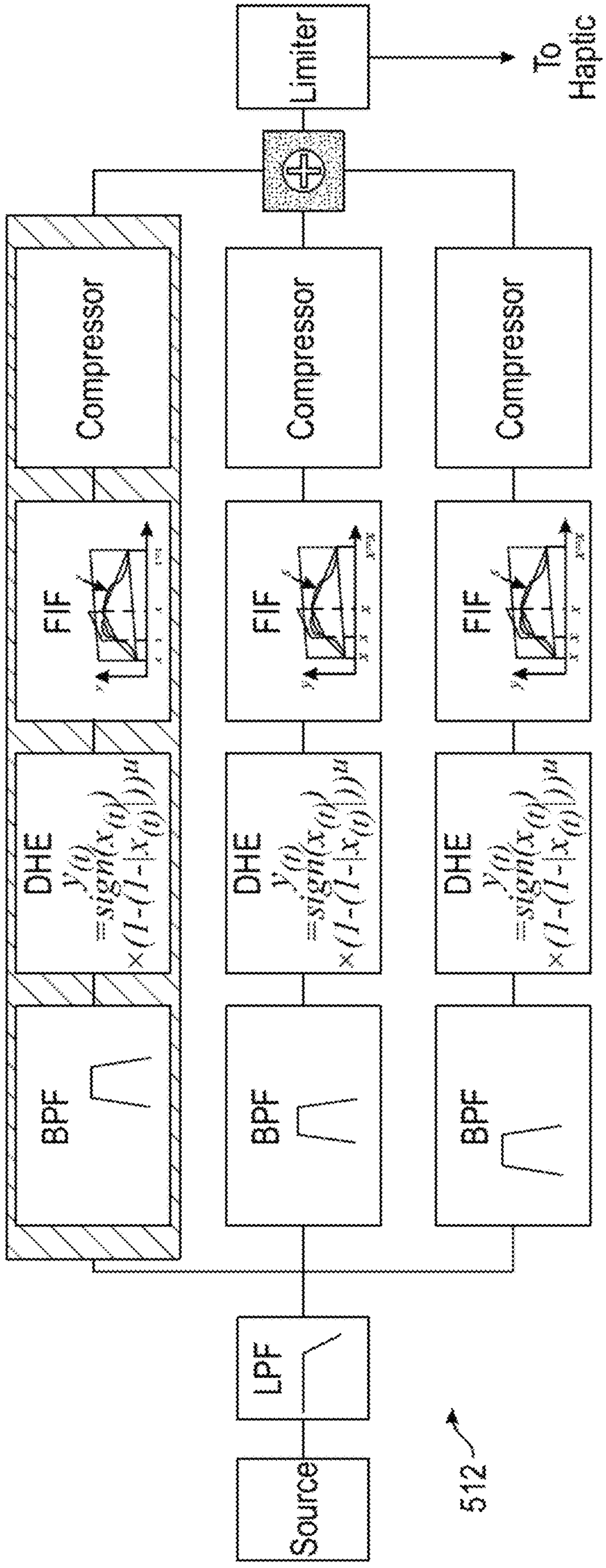

FIG. 5A shows an example continuous sound frequency-intensity graph 508 and continuous sound signal processing framework 512. A corresponding continuous sound time-intensity graph can represent a continuous sound (e.g., a constant beeping, continuous background sound). The sound may be characterized as having a smaller bass component with peaks only at certain frequencies (e.g., within a higher frequency band). It may have a small, oscillating amplitude over time.

As shown by the continuous sound frequency-intensity graph 508, the controlling portion of the filtered sound is the higher frequency band 516. Medium and lower frequency bands do not have a high enough amplitude to be significant contributors to the target frequency band 520. As shown by the continuous sound frequency-intensity graph 508, the signal in the higher frequency band 516 is passed through the continuous sound signal processing framework 512 (e.g., as discussed with respect to FIG. 4) and converted to an updated signal in the target frequency band 520. In some embodiments, the updated frequency signal (from the higher frequency band 516) may be summated with the original signal that was already in the target frequency band 520. The resulting signal may be only slightly modified after the continuous sound signal processing framework 512, in part because the original signal only had significant amplitude in one of the three constituent frequency bands (e.g., the higher frequency band).

Figure 5B:
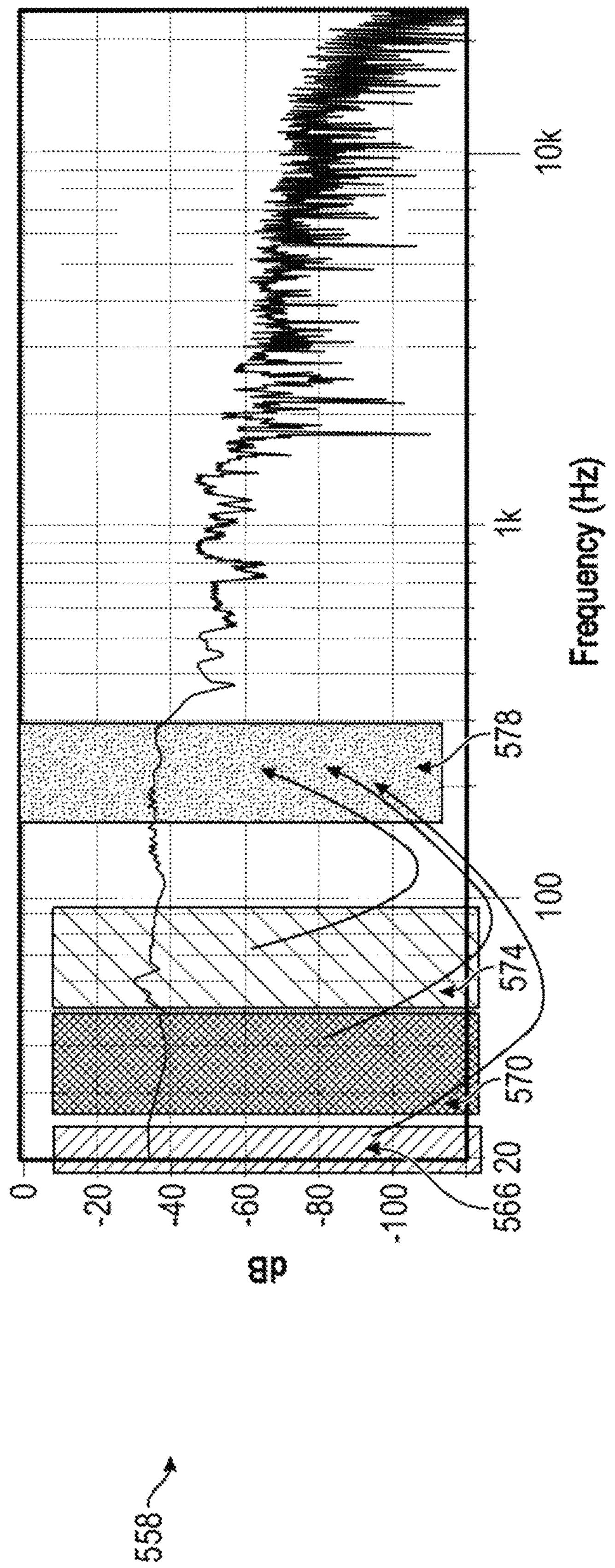
FIG. 5B shows an example impact sound frequency-intensity graph and impact sound signal processing framework.
Figure 5B:
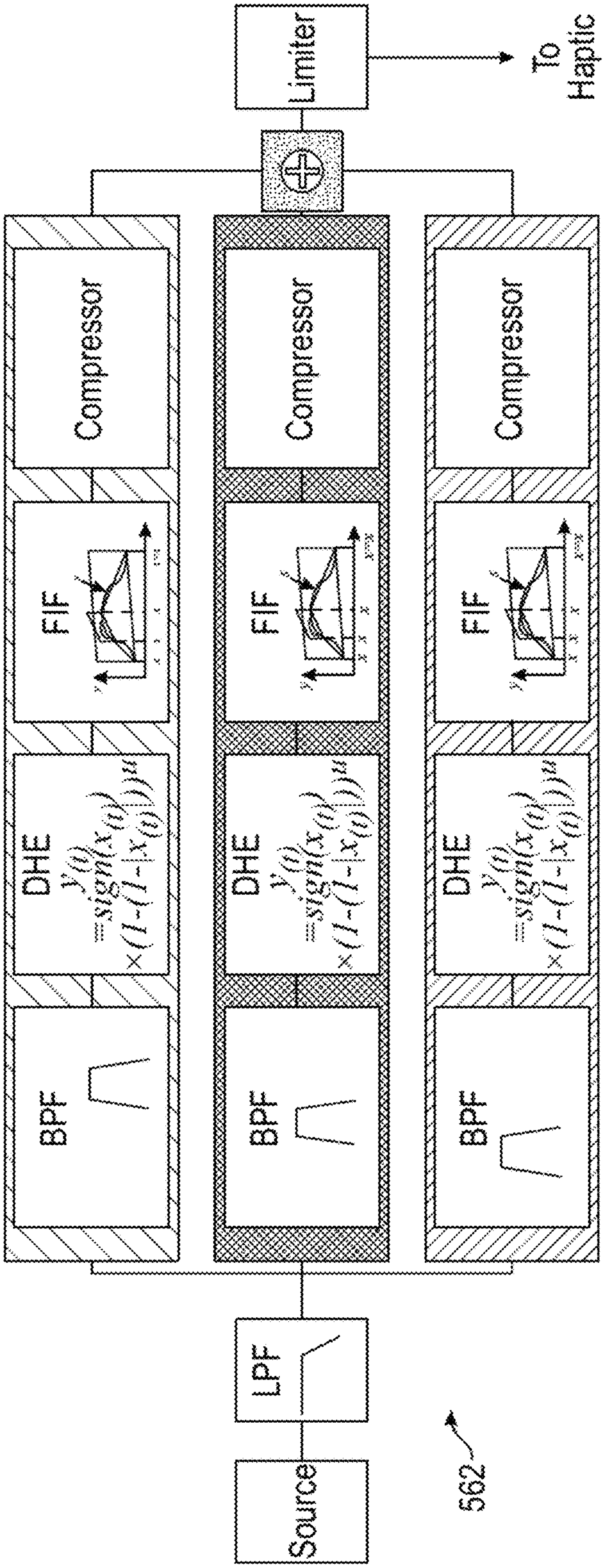

FIG. 5B shows an example impact sound frequency-intensity graph 558 and impact sound signal processing framework 562. A corresponding impact sound time-intensity graph can represent an impact sound (e.g., a clap, a bang, a snap). The impact sound may be characterized as having a loud bass component with elevated amplitudes for a wider band of frequencies (e.g., within lower, medium, and higher frequency bands). It may have a high amplitude at a localized time with a much smaller amplitude before and after the high amplitude.

As shown by the impact sound frequency-intensity graph 558, each of the lower frequency band 566, the middle frequency band 570, and higher frequency band 574 all contribute to the modified signal because the amplitudes of each of these bands are relatively high. Accordingly, each of the constituent signals in the impact sound signal processing framework 562 may be separately converted to an updated signal in the target frequency band 578. In some embodiments, the updated frequency signals from each of the lower frequency band 566, the middle frequency band 570, and the higher frequency band 574 may be summated together with the original signal that was already in the target frequency band 578. The resulting signal may be significantly modified after the impact sound signal processing framework 562, in part because the original signal had significant amplitude in each of the three constituent frequency bands (e.g., the lower frequency band 566, the middle frequency band 570, and the higher frequency band 574), in addition to a relatively high original amplitude within the target frequency band 578. Thus, in this case the system can dramatically improve the user haptic experience even with a frequency-range-limited haptic device (e.g., the second vibration device 214*b*).

Figure 5C:
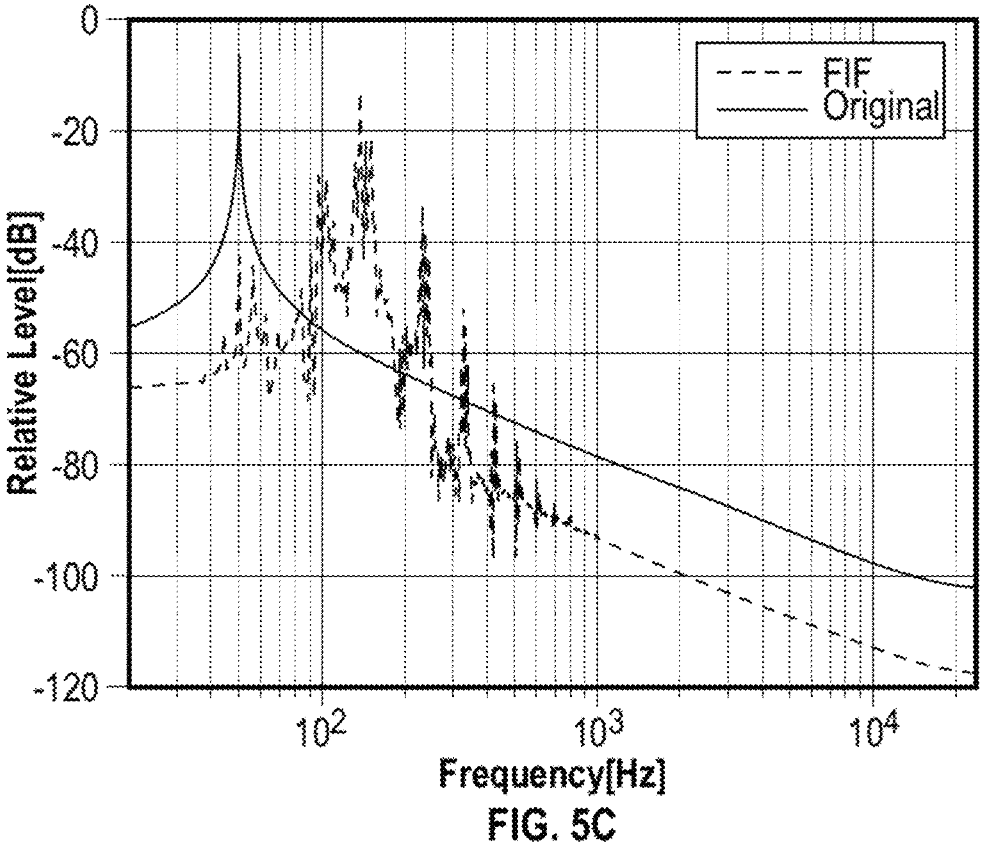
FIG. 5C shows an example frequency-amplitude graph for an original signal compared to a signal that has undergone fractal interpolation via a fractal interpolation function (FIF).

FIG. 5C shows an example frequency-amplitude graph for an original signal compared to a signal that has undergone fractal interpolation via a fractal interpolation function (FIF), such as an FIF described herein. As shown, the original signal has a well-defined peak at about 50 Hz with a smooth attack below 50 Hz and a smooth decay above 50 Hz. This kind of signal may have been stripped of its original "color" or "flavor" (e.g., via hardware and/or software modifications). The FIF can generate a variety of additional frequencies (e.g., overtones) with a more colorful frequency pallet, thus resulting in a likely more enjoyable sound.

Figure 5D:
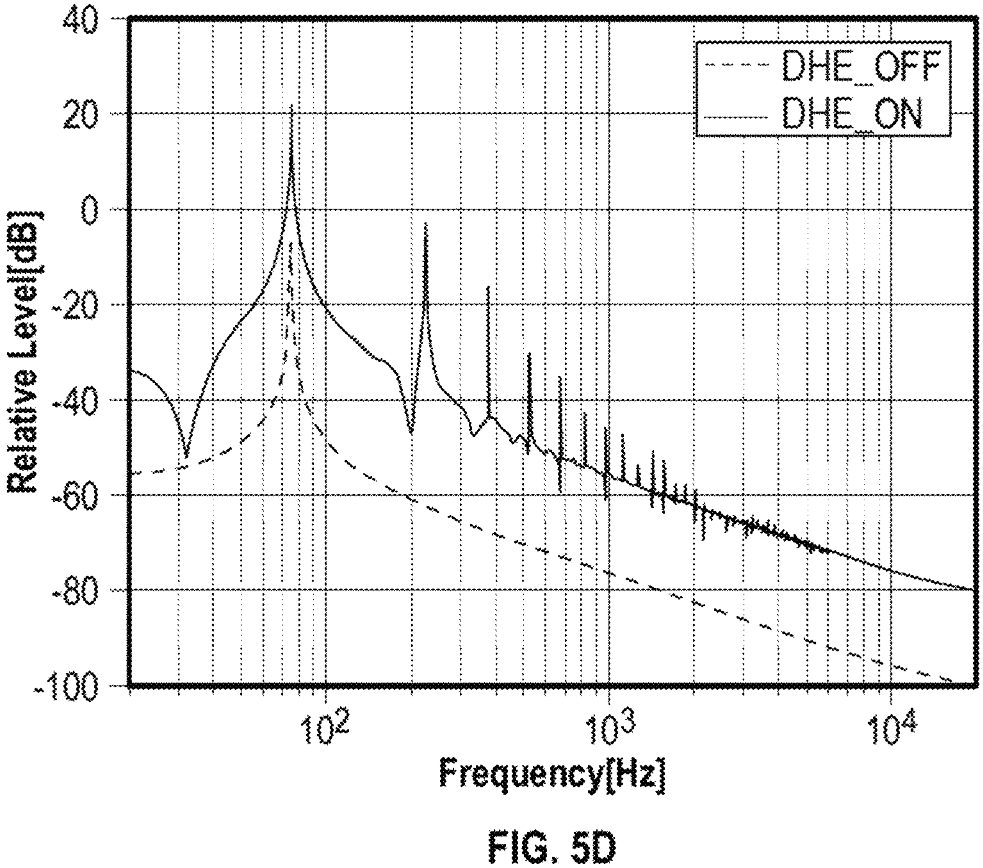
FIG. 5D shows an example frequency-amplitude graph for an original signal compared to a signal that has undergone digital harmonic enhancement (DHE).

FIG. 5D shows an example frequency-amplitude graph for an original signal compared to a signal that has undergone digital harmonic enhancement (DHE), such as the DHE described above. Without DHE, the signal has a well-defined peak at about 75 Hz. Once DHE is applied, the resulting signal includes a variety of additional peaks and higher amplitudes. The additional peaks my represent overtones. These additional frequency peaks can provide a more enjoyable sound through greater variety of sound frequency and amplitude.

Figure 6:
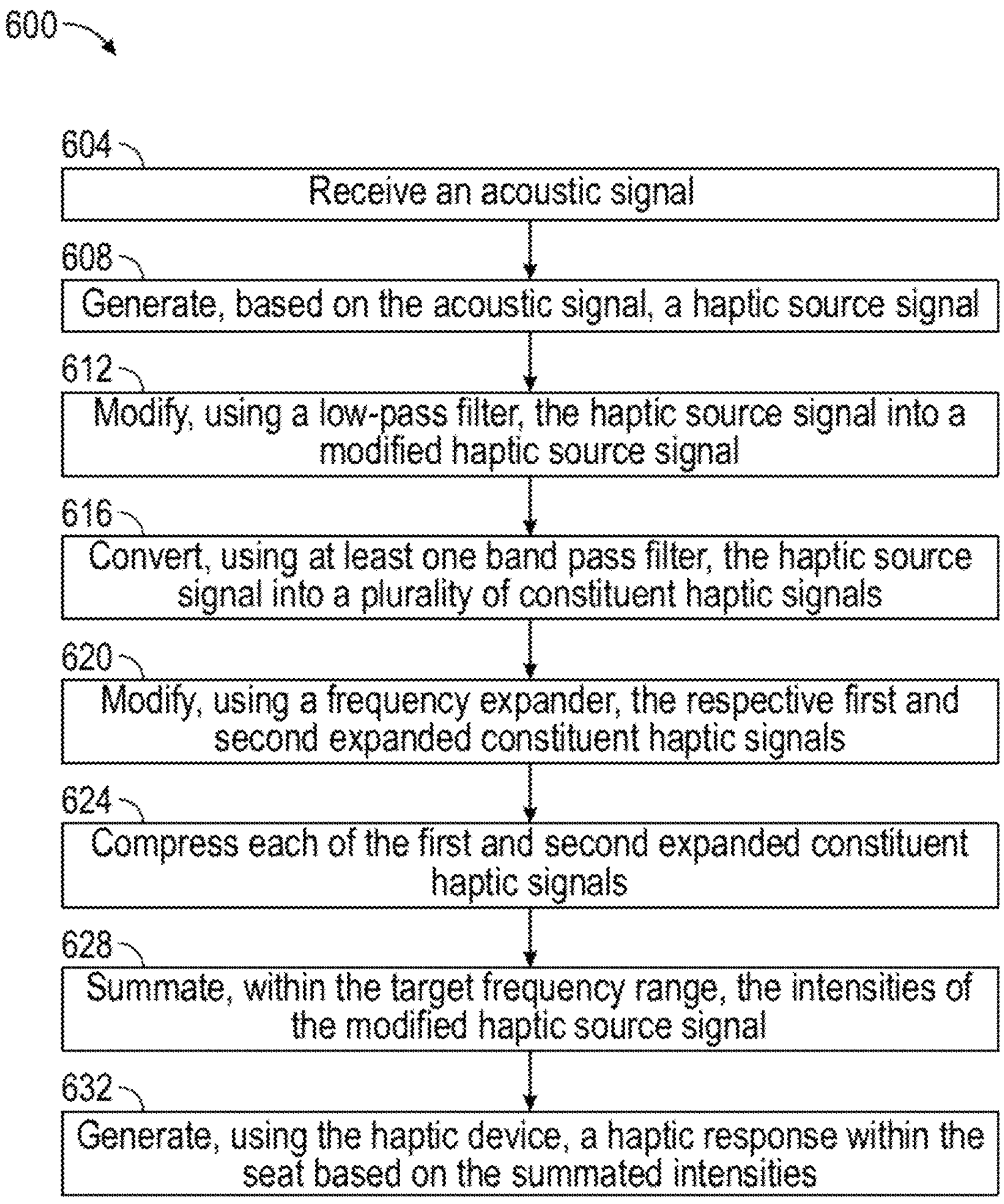
FIG. 6 shows an example method for generating haptic signals within a target frequency range.

FIG. 6 shows an example method 600 for generating haptic signals within a target frequency range. At block 604 the system can receive an acoustic signal. At block 608 the system can generate a haptic source signal based on the acoustic signal. The system can generate the haptic source signal using a haptic signal controller. At block 612 the system can modify the haptic source signal by using a low-pass filter. The resulting modified haptic source signal can include intensities within an initial frequency range that is different from (e.g., below) the target frequency range. Additionally or alternatively the modified haptic source signal may have intensities within the target frequency range. These may be useful later during a summation step.

The system, at block 616 can convert the modified haptic source signal into a plurality of constituent haptic signals. A first of the plurality of constituent haptic signals can include intensities within a first frequency sub-range of the initial frequency range. A second of the plurality of constituent haptic signals can include intensities within a second frequency sub-range of the initial frequency range. The second frequency sub-range may be higher than the first frequency sub-range.

At block 620 the system can use a use a frequency expander to modify the respective first and second expanded constituent haptic signals to have modified intensities within the target frequency range. The modified intensities may be greater than the intensities of the original first and second expanded constituent haptic signals. At block 624, the system can compress one or both of the first and second expanded constituent haptic signals to generate compressed constituent haptic signals having compressed intensities. The compressed intensities may be reduced to be no higher than a threshold intensity. The threshold intensity may be set by a compressor, which may be an algorithm. The compression of the constituent haptic signals may include one or more features of the compressions 424*a-c* described above.

At block 628, the system can summate, within the target frequency range, one or more of: the intensities of the modified haptic source signal, the compressed intensities of the first compressed constituent haptic signal, and/or the compressed intensities of the second compressed constituent haptic signals. At block 632, the system can generate, using the haptic device, a haptic response within the seat based on the summated intensities.

EXAMPLE EMBODIMENTS

Some non-limiting example embodiments are provided below:

In a 1st Example, a haptic seating system comprising: a seat configured to support a human user; a haptic device disposed within the seat and configured to generate haptic signals of at least a minimum force within a target frequency range; a haptic signal controller configured to couple to the haptic device; a non-transitory memory comprising instructions executable by the haptic signal controller, wherein the instructions, when executed by the haptic signal controller, cause the haptic seating system to: receive an acoustic signal; generate, based on the acoustic signal, a haptic source signal; modify, using a low-pass filter, the haptic source signal into a modified haptic source signal comprising intensities within an initial frequency range below the target frequency range and intensities within the target frequency range; convert, using at least one band pass filter, the modified haptic source signal into a plurality of constituent haptic signals, wherein a first of the plurality of constituent haptic signals comprises intensities within a first frequency sub-range of the initial frequency range, and wherein a second of the plurality of constituent haptic signals comprises intensities within a second frequency sub-range of the initial frequency range, wherein the second frequency sub-range is higher than the first frequency sub-range; modify, using a frequency expander, the respective first and second expanded constituent haptic signals to have modified intensities within the target frequency range; compress each of the first and second expanded constituent haptic signals to generate compressed constituent haptic signals having compressed intensities; summate, within the target frequency range, the intensities of the modified haptic source signal, the compressed intensities of the first compressed constituent haptic signal, and the compressed intensities of the second compressed constituent haptic signals; and generate, using the haptic device, a haptic response within the seat based on the summated intensities.

In a 2nd Example, the haptic seating system of Example 1, wherein modifying the respective first and second expanded constituent haptic signals comprises generating harmonic signals of the first and second expanded constituent haptic signals.

In a 3rd Example, the haptic seating system of any of Examples 1-2, wherein generating the compressed constituent haptic signals having compressed intensities comprises reducing intensities of the first and second expanded constituent haptic signals to be no higher than a maximum intensity.

In a 4th Example, a haptic seating system comprising: a seat configured to support a human user; a haptic device disposed within the seat and configured to generate haptic signals within a target frequency range; a haptic signal controller configured to couple to the haptic device; a non-transitory memory comprising instructions executable by the haptic signal controller, wherein the instructions, when executed by the haptic signal controller, cause the haptic seating system to: generate, using at least one band pass filter, a plurality of constituent haptic signals from a source signal having intensities within the target range and within an initial frequency range below the target frequency range, wherein a first of the plurality of constituent haptic signals comprises intensities within a first frequency sub-range of the initial frequency range, and wherein a second of the plurality of constituent haptic signals comprises intensities within a second frequency sub-range of the initial frequency range; generate, using a frequency expander, harmonic signals of the respective first and second constituent haptic signals, the harmonic signals having intensities within the target frequency range; summate, within the target frequency range, the intensities of the haptic source signal and the intensities of the harmonic signals of the first and second constituent haptic signals; and generate, using the haptic device, a haptic response within the seat based on the summated intensities.

In a 5th Example, the haptic seating system of Example 4, wherein the instructions, when executed by the haptic signal controller, further cause the haptic seating system to: receive an acoustic signal; and generate, based on the acoustic signal, the source signal.

In a 6th Example, the haptic seating system of any of Examples 4-5, wherein the instructions, when executed by the haptic signal controller, further cause the haptic seating system to: modify, using a low-pass filter, the haptic source signal into a modified haptic source signal comprising intensities within an initial frequency range below the target frequency range and intensities within the target range.

In a 7th Example, the haptic seating system of any of Examples 4-6, wherein the second frequency sub-range is higher than the first frequency sub-range.

In a 8th Example, the haptic seating system of any of Examples 4-7, wherein the instructions, when executed by the haptic signal controller, further cause the haptic seating system to: compress each of the first and second harmonic signals.

In a 9th Example, the haptic seating system of Example 8, wherein compressing each of the first and second harmonic signals comprises reducing intensities of the first and second harmonic signals to be no higher than a maximum intensity.

In a 10th Example, the haptic seating system of any of Examples 4-9, wherein the second frequency sub-range is higher than the first frequency sub-range.

In a 11th Example, the haptic seating system of any of Examples 4-10, wherein the frequency expander comprises a digital harmonic enhancer.

In a 12th Example, the haptic seating system of any of Examples 4-11, wherein generating the harmonic signals of the respective first and second constituent haptic signals comprises applying a fractal interpolation function to each of the first and second constituent haptic signals.

In a 13th Example, a haptic signal controller comprising: one or more electronic processors; a non-transitory memory comprising instructions, wherein the instructions, when executed by the one or more electronic processors, cause the haptic signal controller to: receive a source signal; generate, based on the source signal, a haptic signal comprising intensities, within an initial frequency range different from a target frequency range, and intensities within the target range; generate, using at least one band pass filter, a plurality of constituent haptic signals from the source signal, wherein a first of the plurality of constituent haptic signals comprises intensities within a first frequency sub-range of the initial frequency range, and wherein a second of the plurality of constituent haptic signals comprises intensities within a second frequency sub-range of the initial frequency range; generate modified signals of the respective first and second constituent haptic signals, the modified signals having intensities within the target frequency range; combine, within the target frequency range, the intensities of the haptic source signal and the intensities of the modified signals of the first and second constituent haptic signals; and transmit a combined haptic signal to a haptic device based on the combined intensities.

In a 14th Example, the haptic signal controller of Example 13, wherein the instructions, when executed by the one or more electronic processors, further cause the haptic signal controller to: receive an acoustic signal; and generate, based on the acoustic signal, the source signal.

In a 15th Example, the haptic signal controller of any of Examples 13-14, wherein the instructions, when executed by the one or more electronic processors, further cause the haptic signal controller to: modify, using a low-pass filter, the haptic source signal into a modified haptic source signal comprising intensities within an initial frequency range below the target frequency range and intensities within the target range.

In a 16th Example, the haptic signal controller of any of Examples 13-15, wherein the second frequency sub-range is higher than the first frequency sub-range.

In a 17th Example, the haptic signal controller of any of Examples 13-16, wherein the instructions, when executed by the one or more electronic processors, further cause the haptic signal controller to: compress each of the modified signals of the first and second constituent haptic signals.

In a 18th Example, the haptic signal controller of Example 17, wherein compressing each of the modified signals of the first and second constituent haptic signals comprises reducing intensities of the first and second constituent haptic signals to be no higher than a maximum intensity.

In a 19th Example, the haptic signal controller of any of Examples 13-18, wherein the second frequency sub-range is higher than the first frequency sub-range.

In a 20th Example, a haptic seat comprising: a seat configured to support a human user; a haptic device disposed within the seat and configured to generate haptic signals; and a haptic signal controller of any of Examples 13-19 configured to couple to the haptic device.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, “code,” “instructions,” “module,” “application,” “software application,” and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user’s computer (e.g., the executing computing device), partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
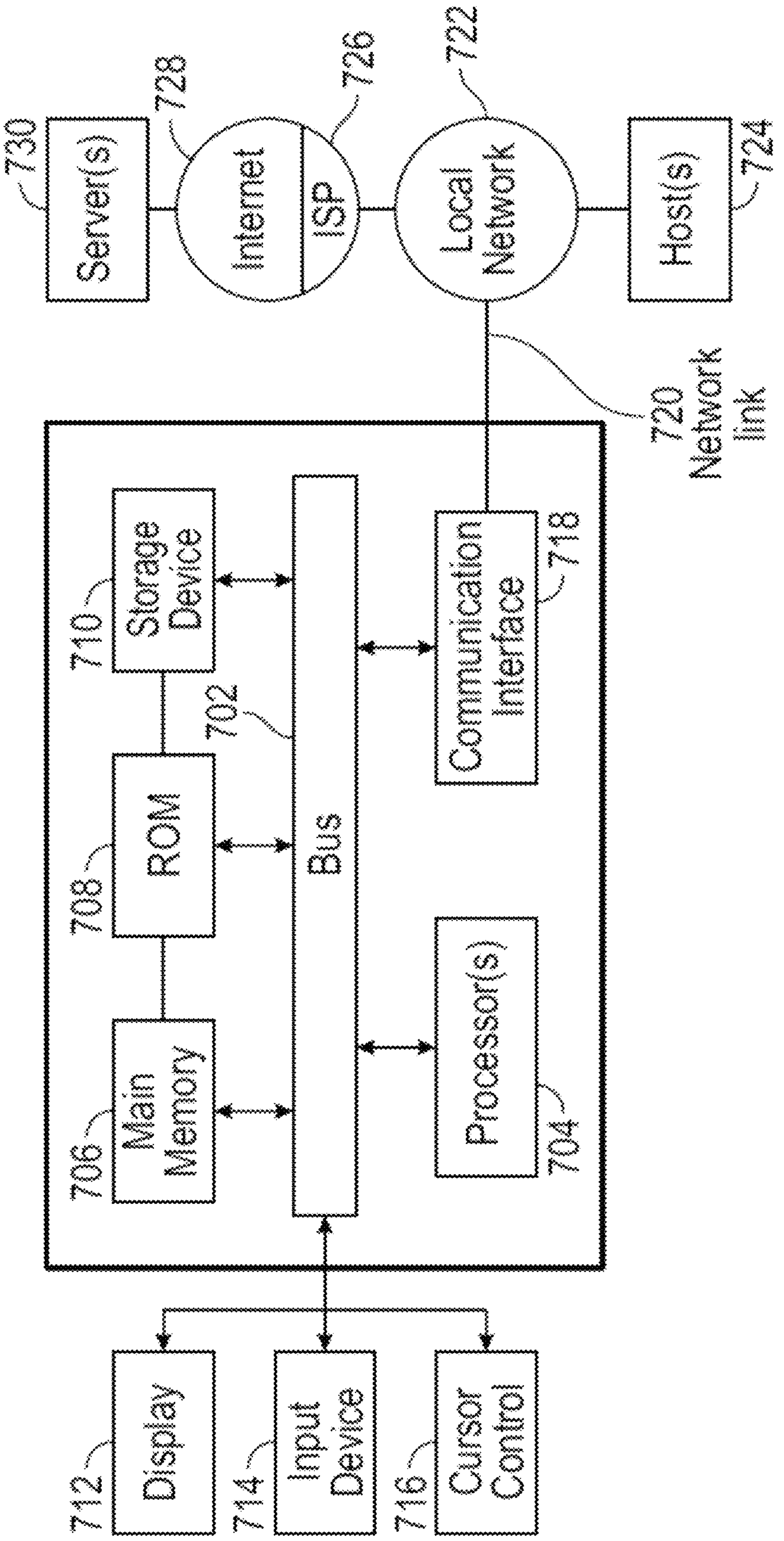
FIG. 7 is a block diagram that illustrates a computer system 700 upon which various embodiments may be implemented.

For example, FIG. 7 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A haptic seating system comprising:

a seat configured to support a human user;

a haptic device disposed within the seat and configured to generate haptic signals of at least a minimum force within a target frequency range;

a haptic signal controller configured to couple to the haptic device;

a non-transitory memory comprising instructions executable by the haptic signal controller, wherein the instructions, when executed by the haptic signal controller, cause the haptic seating system to:

receive an acoustic signal;

generate, based on the acoustic signal, a haptic source signal;

modify, using a low-pass filter, the haptic source signal into a modified haptic source signal comprising intensities within an lower frequency range below the target frequency range and intensities within the target frequency range;

convert, using at least one band pass filter, the modified haptic source signal into a plurality of constituent haptic signals, wherein a first of the plurality of constituent haptic signals comprises intensities within a first frequency sub-range of the lower frequency range, and wherein a second of the plurality of constituent haptic signals comprises intensities within a second frequency sub-range of the lower frequency range, wherein the second frequency sub-range is higher than the first frequency sub-range;

modify, using a frequency expander, the respective first and second expanded constituent haptic signals to have modified intensities within the target frequency range;

compress each of the first and second expanded constituent haptic signals to generate compressed constituent haptic signals having compressed intensities;

summate, within the target frequency range, the intensities of the modified haptic source signal, the compressed intensities of the first compressed constituent haptic signal, and the compressed intensities of the second compressed constituent haptic signals; and generate, using the haptic device, a haptic response within the seat based on the summated intensities.

2. The haptic seating system of claim 1, wherein modifying the respective first and second expanded constituent haptic signals comprises generating harmonic signals of the first and second expanded constituent haptic signals.

3. The haptic seating system of claim 1, wherein generating the compressed constituent haptic signals having compressed intensities comprises reducing intensities of the first and second expanded constituent haptic signals to be no higher than a maximum intensity.

4. A haptic system comprising:

a haptic device configured to be disposed within a seat and configured to generate haptic signals within a target frequency range;

a haptic signal controller configured to couple to the haptic device; and a non-transitory memory comprising instructions executable by the haptic signal controller, wherein the instructions, when executed by the haptic signal controller, cause the haptic seating system to:

generate, using a band pass filter, a constituent haptic signal from a source signal having intensities within the target frequency range and within a lower frequency range below the target frequency range, wherein the constituent haptic signal comprises intensities within a first frequency sub-range of the lower frequency range;

generate, using a frequency expander, harmonic signals of the constituent haptic signal, the harmonic signals having intensities within the target frequency range;

summate, within the target frequency range, the intensities of the haptic source signal and the harmonic signals of the constituent haptic signal; and generate, using the haptic device, a haptic response within the seat based on the summated intensities.

5. The haptic system of claim 4, wherein the instructions, when executed by the haptic signal controller, further cause the haptic seating system to:

receive an acoustic signal; and generate, based on the acoustic signal, the source signal.

6. The haptic system of claim 4, wherein the instructions, when executed by the haptic signal controller, further cause the haptic seating system to:

modify, using a low-pass filter, the haptic source signal into a modified haptic source signal comprising intensities within the lower frequency range below the target frequency range and intensities within the target range.

7. The haptic system of claim 4, wherein the instructions, when executed by the haptic signal controller, further cause the haptic seating system to:

generate, using a second band pass filter, a second constituent haptic signal from the source signal having intensities within the target frequency range and within the lower frequency range below the target frequency range, wherein the second constituent haptic signal comprises intensities within a second frequency sub-range of the lower frequency range, wherein the second frequency sub-range is higher than the first frequency sub-range.

8. The haptic system of claim 7, wherein the instructions, when executed by the haptic signal controller, further cause the haptic seating system to:

compress the harmonic signals.

9. The haptic system of claim 8, wherein compressing the harmonic signals comprises reducing intensities of the harmonic signals to be no higher than a maximum intensity.

10. The haptic system of claim 7, wherein the second frequency sub-range is higher than the first frequency sub-range.

11. The haptic system of claim 4, wherein the frequency expander comprises a digital harmonic enhancer.

12. The haptic system of claim 4, wherein generating the harmonic signals of the constituent haptic signal comprises applying a fractal interpolation function to the constituent haptic signal.

13. A haptic signal controller comprising:

one or more electronic processors;

a non-transitory memory comprising instructions, wherein the instructions, when executed by the one or more electronic processors, cause the haptic signal controller to:

receive a source signal;

generate, based on the source signal, a haptic signal comprising intensities, within an lower frequency range different from a target frequency range, and intensities within the target range;

generate, using at least one band pass filter, a plurality of constituent haptic signals from the source signal, wherein a first of the plurality of constituent haptic signals comprises intensities within a first frequency sub-range of the lower frequency range, and wherein a second of the plurality of constituent haptic signals comprises intensities within a second frequency sub-range of the lower frequency range;

generate modified signals of the respective first and second constituent haptic signals, the modified signals having intensities within the target frequency range;

combine, within the target frequency range, the intensities of the haptic source signal and the intensities of the modified signals of the first and second constituent haptic signals; and transmit a combined haptic signal to a haptic device based on the combined intensities.

14. The haptic signal controller of claim 13, wherein the instructions, when executed by the one or more electronic processors, further cause the haptic signal controller to:

receive an acoustic signal; and generate, based on the acoustic signal, the source signal.

15. The haptic signal controller of claim 13, wherein the instructions, when executed by the one or more electronic processors, further cause the haptic signal controller to:

modify, using a low-pass filter, the haptic source signal into a modified haptic source signal comprising intensities within an initial frequency range below the target frequency range and intensities within the target range.

16. The haptic signal controller of claim 13, wherein the second frequency sub-range is higher than the first frequency sub-range.

17. The haptic signal controller of claim 13, wherein the instructions, when executed by the one or more electronic processors, further cause the haptic signal controller to:

compress each of the modified signals of the first and second constituent haptic signals.

18. The haptic signal controller of claim 17, wherein compressing each of the modified signals of the first and second constituent haptic signals comprises reducing intensities of the first and second constituent haptic signals to be no higher than a maximum intensity.

19. The haptic signal controller of claim 13, wherein the second frequency sub-range is higher than the first frequency sub-range.

20. A haptic seat comprising:

a seat configured to support a human user;

a haptic device disposed within the seat and configured to generate haptic signals; and a haptic signal controller of claim 13 configured to couple to the haptic device.

* * * * *